United States Patent [19]

Sansome

[11] 4,195,316

[45] Mar. 25, 1980

[54] APPARATUS AND METHOD FOR CORRECTING IMPERFECTION IN A POLYGON USED FOR LASER SCANNING

[75] Inventor: Ronald P. Sansome, Weston, Conn.

[73] Assignee: Pitney Bowes Inc., Stamford, Conn.

[21] Appl. No.: 972,582

[22] Filed: Dec. 22, 1978

[51] Int. Cl.² ............................................. H04N 1/04
[52] U.S. Cl. .................................. 358/285; 358/293; 350/6; 350/8; 350/285
[58] Field of Search ......................... 358/285, 293; 340/146.3 H, 146.3 AH; 350/6, 8, 285

[56] References Cited
U.S. PATENT DOCUMENTS

| | | | |
|---|---|---|---|
| 3,999,010 | 12/1976 | Oosaka | 358/285 |
| 4,002,830 | 1/1977 | Brown | 358/293 |
| 4,121,251 | 10/1978 | Arai | 358/293 |
| 4,143,403 | 3/1979 | Ohnishi | 358/293 |

Primary Examiner—Howard W. Britton
Attorney, Agent, or Firm—Peter Vrahotes; William D. Soltow, Jr.; Albert W. Scribner

[57] ABSTRACT

An electro-optical light scanning system using a modulated laser illumination source directed upon a multifaceted rotating polygonal mirror or polygon. The mirrored facets reflect the impinging light toward a moving photoreceptor and forms a raster of scan lines as the photoreceptor moves. The system incorporates sensing optics and closed loop electronics for correcting inaccuracies in the position of the reflected light resulting from deflects in the angular relationship between the plane of the facets and that of the rotating axis of the polygon. Such correction is accomplished through use of selectively located reflective and transparent surfaces wherein location of the impinging light may be determined.

1 Claim, 7 Drawing Figures

APPARATUS AND METHOD FOR CORRECTING IMPERFECTION IN A POLYGON USED FOR LASER SCANNING

BACKGROUND OF THE INVENTION

1. Field of the Invention

The invention pertains to a laser spot scanning system for communicating information to a scanned medium and especially to a scanning system which utilizes reflected light from a multifaceted rotating polygon.

In particular, the invention is directed to a spot scanning system using acousto-optical and electro-optical means and method to compensate for defects in facet-to-axis error.

2. Description of the Prior Art

A recurring problem in scanner systems is to reduce or eliminate error introduced as a result of inherent defects in the construction of rotating polygonal mirrors. Such defects occur usually in the angular relationship between adjacent facets (facets-to-facet) and between facet planes and the polygonal rotational axis (facet-to-axis). A typical solution is to employ non-spherical optics to partially correct the effects of facet angular error as is shown in the apparatus described in the U.S. Pat. No. 4,002,830. Another situation is the use of optical reflecting or refracting elements pivotally mounted in the path of radiation utilizing electromechanical devices that are energized by timed electrical signals such that the refracting element is pivoted to correct the scanning errors caused by angular defects in the rotating mirror. The control of electromechanical devices is preprogrammed to make proper adjustments and the fabrication of the optical systems is thus expensive, as is alignment of the same.

In contrast to systems which use an encoder and logic to correct for error and operate in an open-loop manner by applying a predetermined correction factor, the instant system employs sensing optics and a feedback loop to correct the position of the raster scan lines.

SUMMARY OF THE INVENTION

The invention relates to an electro-optical light scanning system using modulated laser illumination and is particularly adaptable for non-impact and fascimile printing. The light source, such as a laser beam, is acousto-optically modulated in accordance with selected input data. The laser beam so modulated is directed toward a multi-faceted polygon driven at a constant angular velocity. As the successive mirrored facets of the polygon are illuminated, the light reflected generates a plurality of scan lines formed by successive dots which move across a moving photoreceptor and which are modulated to thus generate characters or a recorded likeness of an original image.

In order to reduce scan line displacement errors and further to establish a geometric reference for synchronizing the writing logic with the position of the laser beam, this invention utilizes sensing optics and closed loop electronics for corrective compensation.

In particular, the invention is concerned with correcting facet-to-axis error. The facet-to-axis polygon error is detected by a spot position sensor, e.g., a split detector positioned within the scan format plane or optical equivalent and within the scan path. Before the reflected light traverses the photoreceptor, its longitudinal path axis is detected by the spot position sensor which includes a reflective portion and a transparent portion, the division line of which is parallel to the scan direction. A sensor is associated with each detector portion. A signal is generated which is then processed and used for applying corrective frequency modulation to the acousto-optical modulator to deflect the laser beam to the desired position prior to initiation of the scan line upon the photoreceptor.

BRIEF DESCRIPTION OF THE DRAWING

In an accompanying drawing in which is shown a preferred embodiment of the invention:

FIG. 7 is a graph representing the location of the beam as it engaged the detector.

DESCRIPTION OF THE PREFERRED EMBODIMENT

Figure 1:
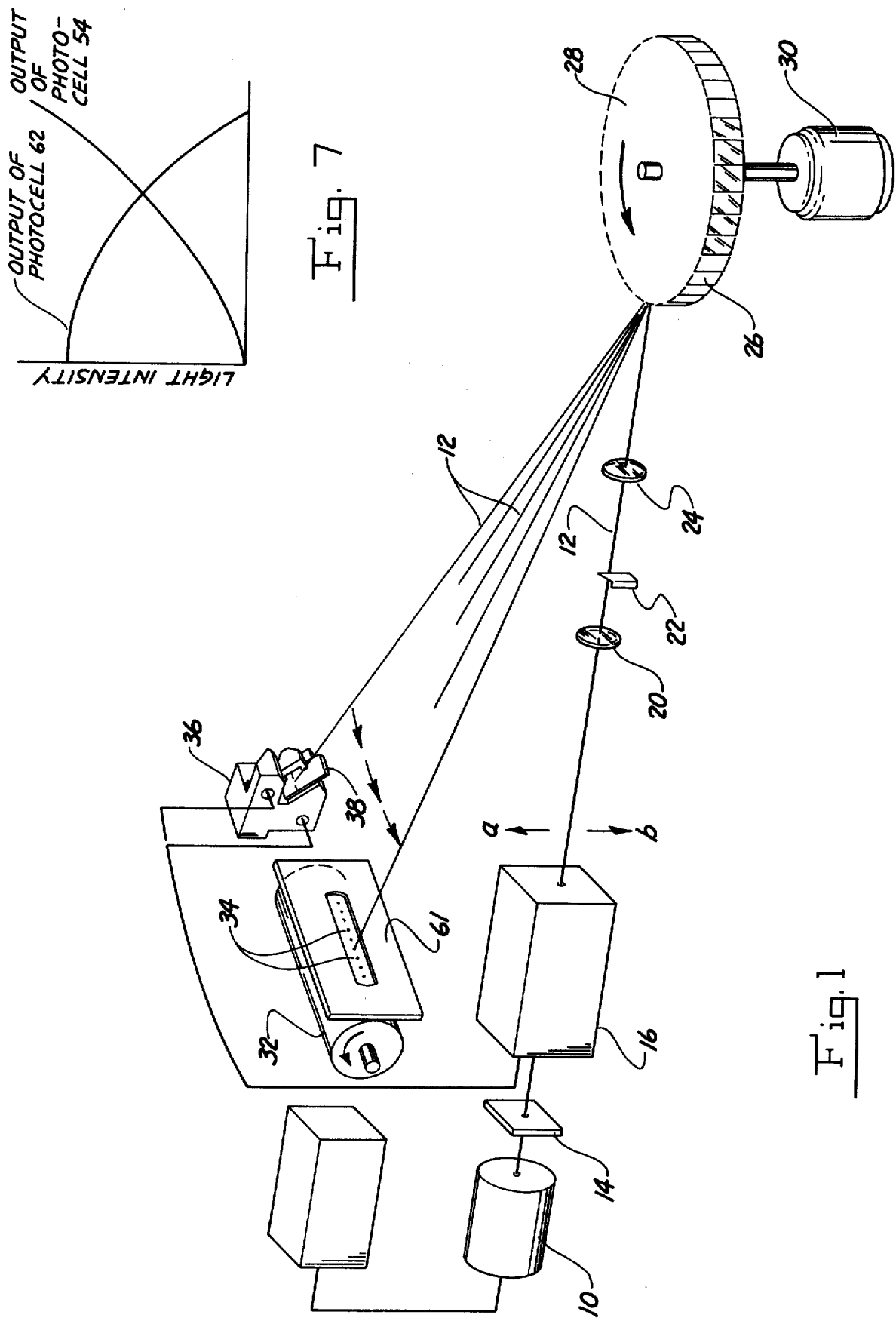
FIG. 1 is a diagramatic representation of the major components of an optical scanning device according to the present invention, the angle of reflection of the beam being distorted for purposes of illustration.
Figure 2:
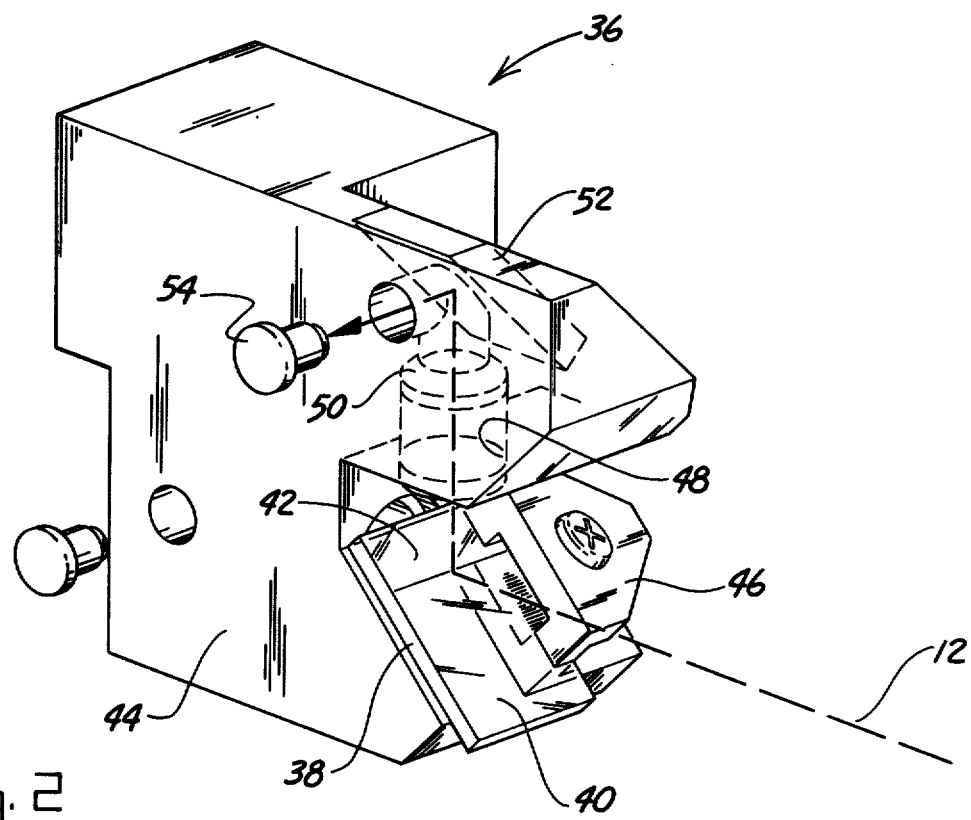
FIG. 2 is an enlarged perspective view of a detector shown in FIG. 1.
Figure 3:
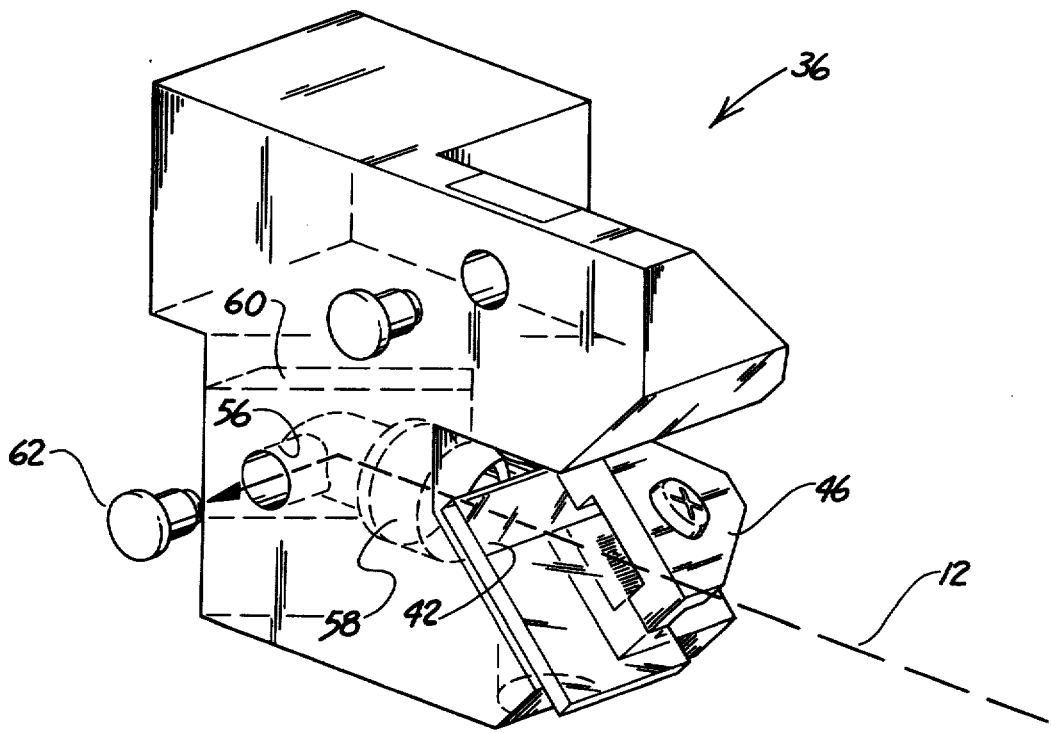
FIG. 3 is a view similar to FIG. 2 but showing the beam in a different location.

Referring now to the drawing, FIG. 1 illustrates an overall view of the scanning system of this invention. The light source, such as a laser 10, which may be a low power helium-neon laser, generates a collimated beam 12 of monochromatic light which is directed through a variable neutral density filter 14 to control the light intensity. The beam 12 then passes through a modulator 16, such as an acousto-optical modulator. The beam 12 is next directed through a first lens 20 and intercepted by a knife edge 22 placed at the focal point of the first lens 20. The knife edge 22 is employed for stopping the zero order Bragg beam. The first order beam when executed is thus separated and passes the knife edge 22 unattenuated. An example of a commercially available acousto-optical modulator is Model 1209 by Isomet Corp, Springfield, VA., which provides a built-in Bragg angle adjustment. The modulator 16 can typically be operated by a digital driver, such as Model no. 220 available from Isomet Corp. wherein transistor-transistor logic compatible digital input controls an RF switch for on-off gating of the modulator 16. Another acousto-optical modulator that is commercially abailable is Model 304 manufactured by Coherent Associates, Danbury, Conn.

It is desirable to use the first order beam to produce a spot because the position of the spot can be displaced in accordance with frequency modulation applied to the modulator which will selectively deflect the beam 12 in a desired direction such as indicated by the arrows a,b. The first order beam 12 is then directed toward a second lens 24 which directs a converging beam onto a reflecting face or facet 26 of a rotating polygonal mirror, herein referred to as a polygon 28. The polygon 28 is continuously driven by a motor drive 30 and preferably is maintained at a constant velocity. In the prefered embodiment as shown, the polygon 28 has thirty facets 26 and is designed for generating approximately 240 scan lines per second. A moderate spot velocity is preferred for implementing the optical spot sensing and closed loop feedback correction circuitry.

The beam 12 is thus reflected successively from each of the facets 26 of the rotating polygon 28 and onto a photoreceptor 32. The reflection of the beam 12 from the polygon 28 is distorted for purposes of illustration as it will be appreciated that the incident beam and reflecting beam will be in the same plane rather than at an angle to one another as indicated by FIG. 1. The modulated beam 12 may appear as a succession of dots 34 which will generate a scan line forming a raster across the moving photoreceptor 32. The photoreceptor 32 may be any image plane and can be mounted on a rotating drum such as for use with an electrophotographic copier.

It should thus be apparent that the light scanning system of the present invention can be readily interfaced with an electrophotographic copier having panchromatic photoreceptors and can thus function as a high quality non-impact printer.

It is well known that various types of errors are inherent in the geometric fidelity of a commercially available rotating polygon. In particular, deviation in parallelism of each facet relative to the axis of rotation introduces a facet-to-axis error and the resulting scan lines will correspondingly contain these inaccuracies which manifest themselves as alignment deviations from a desired scan line travel axis, i.e., line to line spacing variation. The present invention provides a spot correction assembly or detector 36 for optically detecting and correcting for these facet-to-axis errors. The spot correction detector 36 in the preferred embodiment, is provided with an optical detector in the form of a split member 38 optically positioned in the scan format plane and divided to form a reflective portion 40 and a transparent portion 42. The split member 38 is supported upon a housing 44 at an angle of approximately 45° relative to the horizontal by a clamp 46. Located above the split member 38 is a generally "L" shaped opening 48 that is in general alignment with the dividing line between the reflective and transparent portion 40, 42, respectively. Received within the opening 48 are a lens 50 and a mirror 52. A photocell 54 is received within the opening 48 and is spaced relative to the mirror 52 to receive the beam 12 when reflected therefrom. A second generally "L" shaped opening 56 is located in horizontal alignment with the split member 38. Received within the second opening 56 is a lens 58 and a mirror 60. A photocell 62 is received within the opening 56 and is spaced relative to the mirror 60 to receive a beam 12 reflected therefrom.

Figure 4:
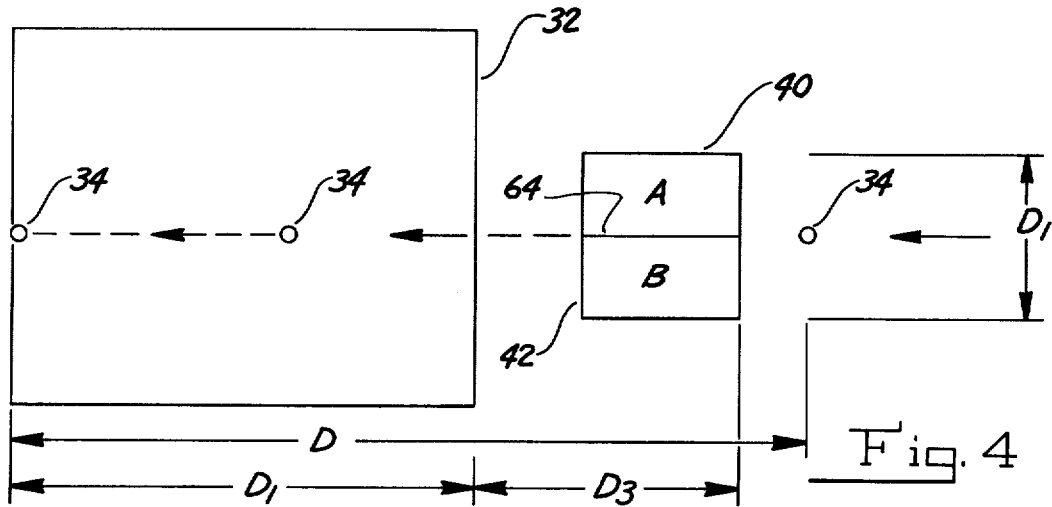
FIG. 4 is a schematic representation of the longitudinal travel of a modulated laser beam approaching and crosing a spot detector and photoreceptor.

Referring now to FIG. 4, maximum allowable uncorrected facet-to-axis angular error may cause the spot 34 to fall anywhere within a transverse zone $D_1$ within the light sensitive area of split member 38. Successive scans as determined by the rotating polygon 28 are a distance D apart which is greater than $D' + D_3$. It should thus be evident that the correction of each successive spot 34 is achieved during a "dead" time, i.e., the period of travel prior to traversing the photoreceptor 32.

Figure 5:
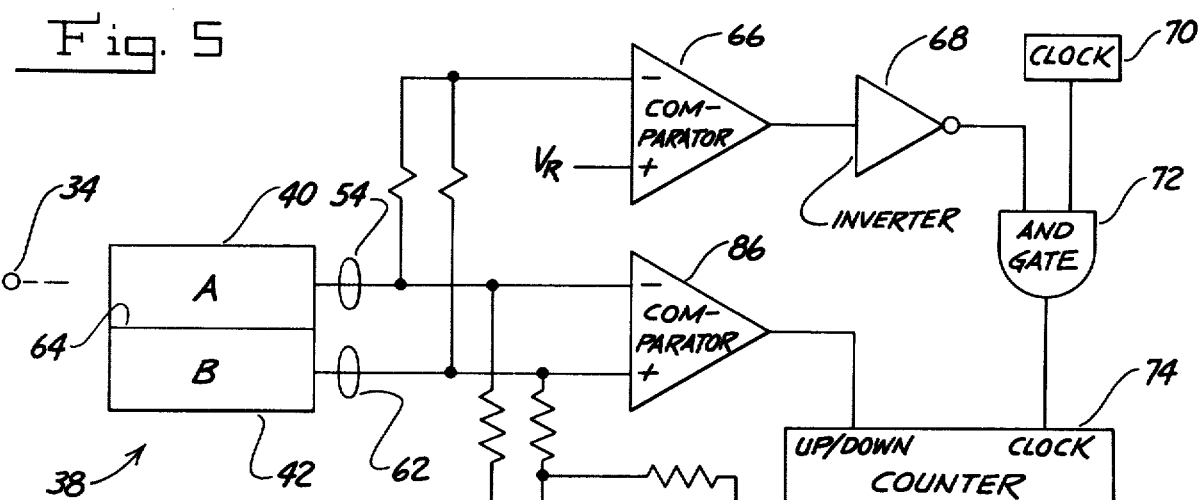
FIG. 5 is a schematic diagram of the spot correction logic.

A typical logic circuit implementing the present invention for control of an acousto-optical deflector to provide compensating deflection of the laser beam such that the spot 34 will exit the detector 36 in registration with the dividing line 64 between the line portions 40, 42 of the split member 38 is shown in FIG. 5. When an uncorrected spot 34 of the laser beam enters the detector 36, a comparator 66 compares the signal generated at either photocell 54 or 62 with a reference voltage $V_r$ and provides a low output signal to an inverter 68 to generate a high enabling signal at an AND gate 45. A system clock 70 provides correction count pulses as a second input to the AND gate 72. The presence of the spot 34 at either portion 40 or 42 provides a high signal at the AND gate 72 enabling clock pulses to pass through the AND gate 72 and register at a counter 74. The instantaneous count of the counter 74 drives a digital to analog converter 76 which in turn provides an analog correction signal via a voltage controlled oscillator 70, an amplitude control 80, and an amplifier 82 to an acousto-optical deflector 84 which is incorporated into the modulator 16. The beam 12 will thus be displaced in the appropriate direction a or b. The amplitude control 80 is connected to a summer 88 that measures the amount of light falling on the portions 40, 42 of the split member 38 to maintain the light output constant to the acousto-optical deflector 84.

It should be appreciated that the direction of count of the counter 74 determines the direction of corrective deflection applied by the deflector 84. In order to control the direction of count, a second comparator 86 compares the output of the reflective portion 40 with respect to the output of the transparent portion 42. If the terminal spot 34 of the laser beam falls upon the reflective portion 40 and enters the photocell 54, the output will be greater than that of the photocell 62, and the comparator 86 will provide a low output. The low output of comparator 86 determines the count direction of the counter 74. As the deflecting correction is applied, the spot 34 progresses towards the transparent portion 42 while translating across the split member 38.

As soon as the spot 34 crosses onto the transparent portion 42, the signal from the photocell 62 will be greater than the signal from the photocell 54 which causes the comparator 86 to switch to a high output. The high output of the comparator 86 reverses the direction of the counter 74 and thus provides an opposite direction of corrective deflection of the laser beam such that the laser beam will progress towards the reflective portion 40. Thus, the spot 34 will track the dividing line 64 until it exits from the detector 36 at which time the clock 70 is disabled and the correction value for the particular facet 26 is digitally stored in counter 74 until the next uncorrected spot enters the detector.

Figure 6:
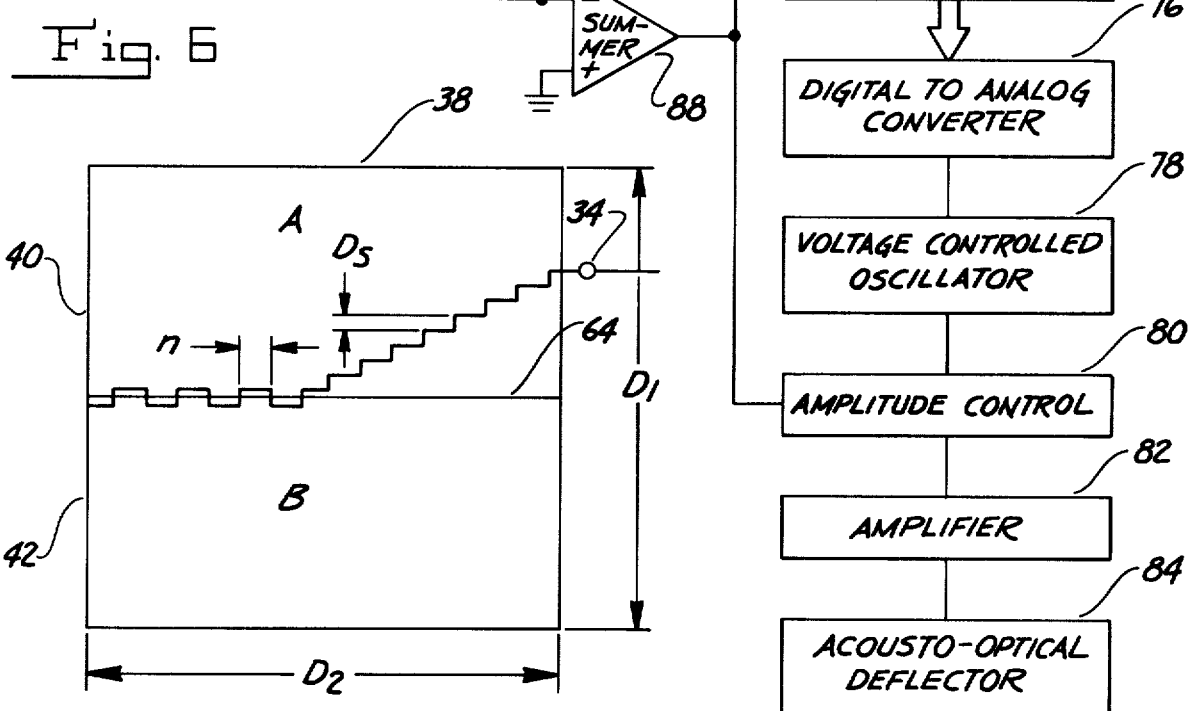
FIG. 6 is a diagramatic illustration of spot displacement during corrective modulation.

The control process is further detailed in FIGS. 6 and 7. The spot 34 is shown at the right entering the split member 38 at reflective portion 40. The displacement of the spot 34 resulting from an incremental change in the counter 74 is reflected through the closed loop control circuitry through a deflection in either direction. The uncertainty of the exit point of spot 34 is $\pm D_s$ due to the digitalization of the signal. The amount $D_s$ is less than the tolerable error. With a given voltage controlled oscillator and acousto-optical modulator, $D_s$ can be carried by changing the scaling factor of the digital to analog converter. Since the most extreme error would be equivalent to $D1/2$, the number of correction steps to bring the spot 34 to the dividing line 64 is a maximum of $n = D1/2D_s$. Assuming it takes a given time $(t_s)$ to perform a corrective step, the total time in $(n)(t_s) = D_1 t_s/2D_s$. If the spot velocity is $V_s$, then the minimum length of photocell required is $D_2 = (D_1 t_s/2D_s)(V_s)$. A typical value for $V_s$ is 2200 inches per second. In FIG. 7 the output of the photocells 54 and 62 is shown wherein the beam would transend from being completely incident upon the reflective portion to being completely incident upon the transparent portion. The intersection of the two lines in the graph represents the spot 34 falling upon the dividing line 64 of the split member 38. When the spot 34 is located at the dividing line 64 the output from the two photocells will be equal and as the spot is displaced one way or the other the outputs of the photocells 54, 62 will become unequal. Obviously, it is desirable to have the scan in alignment with the dividing line 64 as it emerges from the detector 36. With such dividing line 64 the full light intensity of the beam 12 will always be utilized so that positive control is assured.

What is claimed is:

1. A light scanning apparatus, comprising: means for generating a laser beam, a multifaceted reflective polygon positioned in the beam path, amplitude modulating means intermediate the laser gernerating means and the polygon for deflecting the beam, means for rotating the polygon, whereby a beam being reflected from successive facets of the polygon sweeps along a scan path to provide successive raster lines, and a photoreceptor positioned to have a portion of each of the raster lines extend thereacross, the improvement comprising: detector means being positioned along the scan path adjacent to the photoreceptor in the path of at least part of the balance of each of said raster lines, said detector means including a reflective surface and a transparent surface, first light sensing means spaced relative to said reflective surface to receive light reflected from said reflective surface, second light sensing means spaced relative to said transparent surface to receive light passing therethrough, means connecting said first and second light sensing means with the amplitude modulating means to provide at least one signal indicative of the presence of the beam at a said surface, the modulating means being responsive to said signal to adjust the location of the beam so as to be incident upon both of said surfaces simultaneously.

* * * * *